(12) United States Patent
Yizhi et al.

(10) Patent No.: US 10,451,819 B2
(45) Date of Patent: Oct. 22, 2019

(54) LATCH FIT, DE-LATCHING MECHANISM AND OPTICAL MODULE INCLUDING THE SAME

(71) Applicant: Source Photonics (Chengdu) Company Limited, Chengdu (CN)

(72) Inventors: Zeng Yizhi, Chengdu (CN); Wang Zili, Chengdu (CN); Zhang Shaoyou, Chengdu (CN); Chen Ximin, Chengdu (CN); Wang Jinlin, Chengdu (CN)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 182 days.

(21) Appl. No.: 15/504,440

(22) PCT Filed: Nov. 30, 2016

(86) PCT No.: PCT/CN2016/107992
§ 371 (c)(1),
(2) Date: Feb. 16, 2017

(87) PCT Pub. No.: WO2018/098676
PCT Pub. Date: Jun. 7, 2018

(65) Prior Publication Data
US 2018/0275357 A1    Sep. 27, 2018

(51) Int. Cl.
*G02B 6/38* (2006.01)
*G02B 6/42* (2006.01)

(52) U.S. Cl.
CPC ......... *G02B 6/3893* (2013.01); *G02B 6/4261* (2013.01); *G02B 6/4292* (2013.01)

(58) Field of Classification Search
CPC .... G02B 6/389; G02B 6/3893; G02B 6/4261; G02B 6/4292
See application file for complete search history.

(56) References Cited

U.S. PATENT DOCUMENTS 6,439,918 B1 * 8/2002 Togami ............... G02B 6/4246
                                                 439/157
7,314,384 B2   1/2008 Togami et al.
(Continued)

FOREIGN PATENT DOCUMENTS

CN        101110640 A      1/2008
CN        201740891 U      2/2011
(Continued)

OTHER PUBLICATIONS

Chen Ximin et al.; "Optical Module Unlocking Structure"; Bibliographic Data of CN205404903 (U); Jul. 27, 2016; http://worldwide.espacenet.com.

(Continued)

*Primary Examiner* — Daniel Petkovsek
(74) *Attorney, Agent, or Firm* — Andrew D. Fortney; Central California IP Group, P.C.

(57) ABSTRACT

The present disclosure relates to a latch fitting, a de-latching mechanism and an optical module using the same. The latch fitting includes a tapered end, a latch body and a latch tail in serial connection. The latch body includes a spindle. The latch body can rotate around the spindle. The latch tail comprises a first de-latching portion configured to de-latch the optical module by sliding movement. The present latch fitting, de-latching mechanism and optical module provide multiple de-latching methods with an easy and simple operation. Also, the present latch fitting and de-latching mechanism provide an improved solution for preventing optical modules from being damaged relative to conventional de-latching methods.

18 Claims, 10 Drawing Sheets

(56) References Cited

U.S. PATENT DOCUMENTS

| | | | | |
|---|---|---|---|---|
| 7,325,975 | B2* | 2/2008 | Yamada | G02B 6/4292 |
| | | | | 385/54 |
| 7,351,090 | B1* | 4/2008 | Moore | G02B 6/4246 |
| | | | | 439/372 |
| 7,955,003 | B2* | 6/2011 | Teo | H01R 13/6275 |
| | | | | 385/88 |
| 8,724,955 | B2* | 5/2014 | Lavoie | H01R 13/6335 |
| | | | | 385/134 |
| 9,122,030 | B2* | 9/2015 | Xie | G02B 6/4277 |
| 9,316,797 | B2* | 4/2016 | Ista | G02B 6/3807 |
| 9,841,568 | B2* | 12/2017 | Wang | H01R 13/6335 |
| 10,042,130 | B1* | 8/2018 | Wang | G02B 6/3897 |
| 2007/0059953 | A1 | 3/2007 | Togami et al. | |
| 2013/0322832 | A1* | 12/2013 | Wang | G02B 6/4261 |
| | | | | 385/92 |

FOREIGN PATENT DOCUMENTS

| | | |
|---|---|---|
| CN | 203287568 U | 11/2013 |
| CN | 104516067 A | 4/2015 |
| CN | 104617445 A | 5/2015 |
| CN | 205404903 U | 7/2016 |
| EP | 3211468 A1 | 8/2017 |

OTHER PUBLICATIONS

Yang Xinzhi et al.; "Small pluggable Connector with Locking and Unlocking Mechanism"; Bibliographic Data of CN104617445 (A); May 13, 2015; http://worldwide.espacenet.com.

Luo Yaoxin et al.; "Locking and Unlocking Mechanism for Optical-Electric Module"; Bibliographic Data of CN104516067 (A); Apr. 15, 2015; http://worldwide.espacenet.com.

Jiang Hongsheng; "Self-Unlocking Mechanism with Pull Ring and Tilting Plate"; Bibliographic Data of CN203287568 (U); Nov. 13, 2013; http://worldwide.espacenet.com.

Xianjin Yang et al.; "Unlocking Resetting Device of Double-Fiber Bidirectional SFP Light Receiving and Transmitting Integral Module Casing"; Bibliographic Data of CN201740891 (U); Feb. 9, 2011; http://worldwide.espacenet.com.

Zuliang Gu; "Draw Ring Type Tripper Used for Optoelectronic Module"; Bibliographic Data of CN101110640 (A); Jan. 23, 2008; http://worldwide.espacenet.com.

Yaoxin Luo et al.; "Locking and Unlocking Mechanism of Photoelectric Module"; Bibliographic Data of EP3211468 (A1); Aug. 30, 2017; http://worldwide.espacenet.com.

International Search Report dated Jan. 9, 2017; PCT International Application No. PCT/CN2016/107992; 14 pages; State Intellectual Property Office, Beijing, China.

* cited by examiner

LATCH FIT, DE-LATCHING MECHANISM AND OPTICAL MODULE INCLUDING THE SAME

RELATED APPLICATION(S)

The present application is a national phase application of International Application No. PCT/CN2016/107992, filed Nov. 30, 2016, which is incorporated herein by reference as if fully set forth herein.

FIELD OF THE INVENTION

The present invention relates to the field of optical modules, especially to latch fittings, de-latching mechanisms and optical modules including the same.

DISCUSSION OF THE BACKGROUND

Optical transmitter-receiver modules (optical modules for short) are utilized primarily to provide optical-electronic and electronic-optical transmission of information. Generally, optical modules include optoelectronic devices, functional circuits and optical interfaces, and play an important role in optical fiber communication systems. Various package types for optical modules can be classified as SFP, GBIC, XFP, etc. SFP optical modules represent small form package optical modules that are hot-pluggable, which enables the optical modules to be connected to or disconnected from equipment when the power to the equipment is on. As SFP optical modules are inserted and extracted frequently in use, the optical modules need a built-in or integrated releasing piece or de-latching mechanism to free the optical module from the cage or socket on a system main board smoothly.

Conventional de-latching mechanisms for optical modules work by driving a tapered end using the lever principle to perform a de-latching action. That is to say, the tapered end is at one end of a lever, and the other end of the lever is connected to a pull-tab. When de-latching, lifting the pull-tab moves the tapered end downwards so that the tapered end can be released from a corresponding lock hole in the cage or socket. In this way, de-latching requires lifting the pull-tab at a relatively large angle to make the lever rotate in place. Otherwise, de-latching fails, and the tapered end or the cage or socket can be damaged.

SUMMARY OF THE INVENTION

The present invention is intended to provide a latch fitting, a de-latching mechanism and optical modules using the same.

In order to implement the above-mentioned purpose, embodiments of the present invention provide various technical schemes:

The present invention provides a latch fitting, comprising a tapered end, a latch body and a latch tail in serial connection. The latch fitting can rotate around a spindle. The latch tail comprises a first de-latching portion configured to perform a de-latching operation by sliding movement.

In one embodiment, the first de-latching portion includes one or more tilted or angled stand bars.

In another embodiment of the present invention, the latch tail further includes a second de-latching portion configured to perform a de-latching operation by rotation. In an alternative embodiment, the second de-latching portion includes a surface plate.

A de-latching mechanism applicable for optical modules comprises the latch fitting of any of the embodiments of the present invention. The latch fitting is located within a first cavity in a pedestal of the optical module and can rotate around the spindle to perform a de-latching operation.

In another embodiment, the de-latching mechanism further comprises a pull-tab having a pull rod. The pull rod includes one or more arm portions and/or a protrusion portion. The protrusion portion is configured to move the second de-latching portion upward or away from the pedestal to de-latch the optical module when the pull rod rotates (for example, within or along sliding grooves on the pedestal). The arm portion is configured to move the first de-latching portion upward or away from the pedestal to de-latch the optical module when the pull rod slides (for example, within or along the sliding grooves on the pedestal).

The present invention provides an optical module, comprising a pedestal and the de-latching mechanism of any of the embodiments of the present invention.

The present latch fitting, de-latching mechanism and optical module using the same can implement multiple de-latching actions or operations, including by rotation, by sliding, or a combination thereof. Furthermore, when the latch fitting and/or de-latching mechanism de-latches the optical module by a combination of rotating and sliding, the pull rod can de-latch the optical module using a relatively small rotation angle. In this simple way, de-latching operations are facile, and avoid damage to latch fittings and/or cages or sockets in system boards due to some relatively complex de-latching operations.

BRIEF DESCRIPTION OF THE DRAWINGS

Reference will now be made in detail to various embodiments of the invention, examples of which are illustrated in the accompanying drawings. While the invention will be described in conjunction with the following embodiments, it will be understood that the descriptions are not intended to limit the invention to these embodiments.

ITEM CODE

Figure 1A:
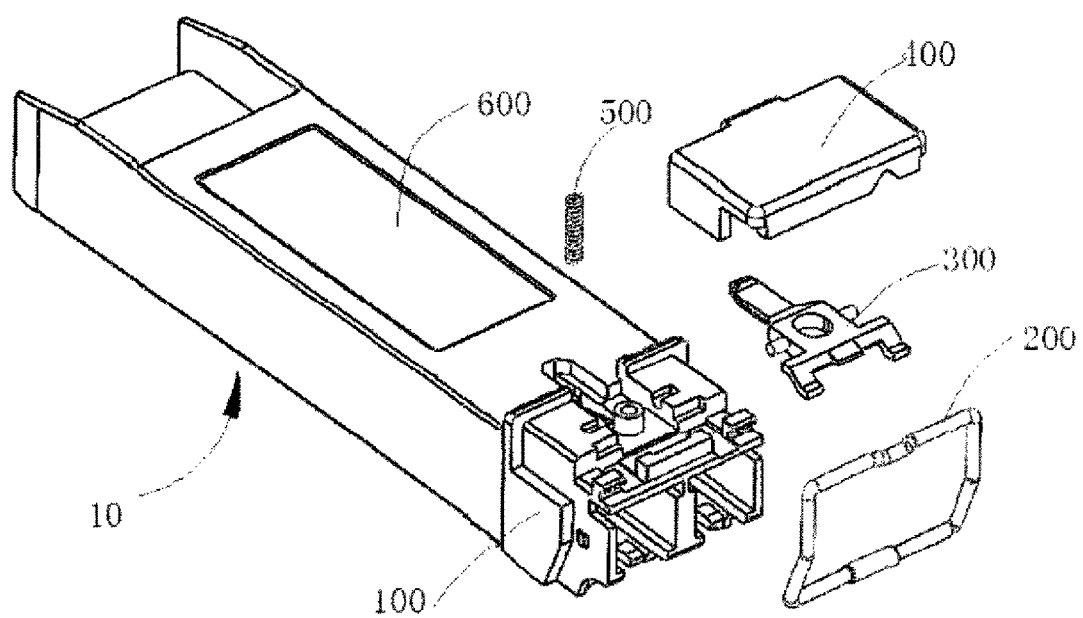
FIGS. 1a-1b are exploded views showing the structure of an optical module in accordance with one or more embodiments of the present invention.
Figure 1B:
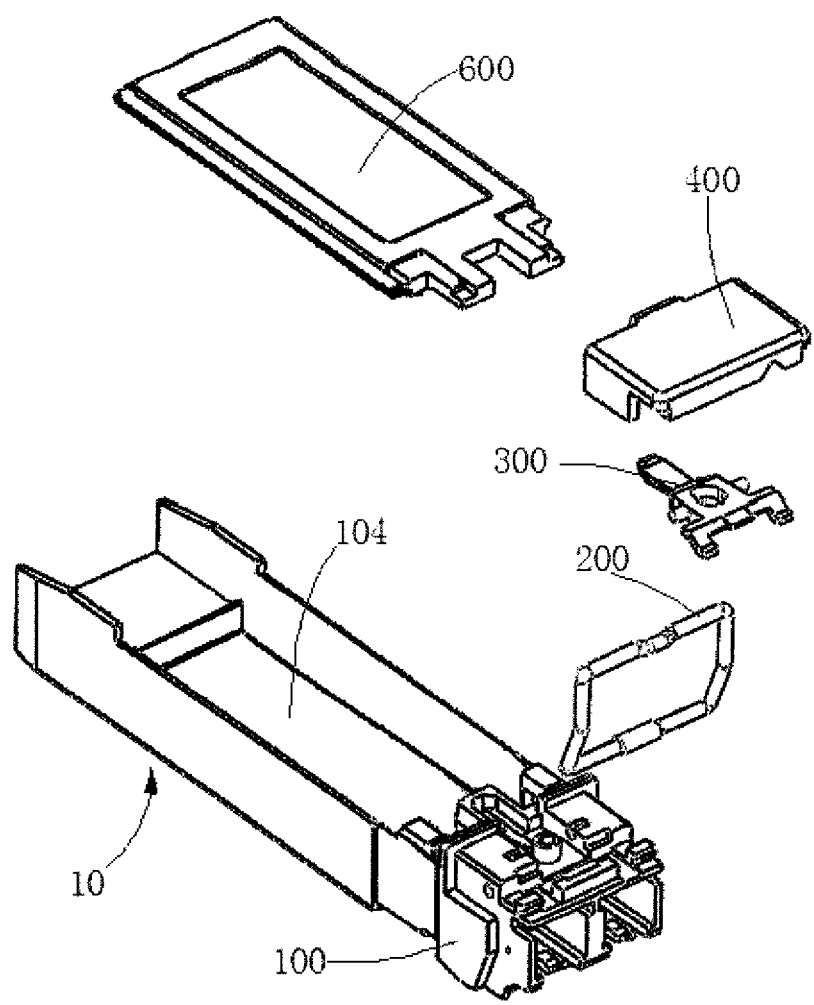

Optical module 10, arm portion 20, pedestal 100, sliding groove 101, boss 102, first cavity 103, second cavity 104, pull-tab 200, first arm portion 201, protrusion portion 202, second arm portion 203, angled or [-shaped rod 204, latch fitting 300, strengthening plate 301, tapered end 302, transition portion 303, latch body 304, spindle 305, surface plate 306, extended end 307, angled or tilted stand bar 308, extended faceplate 309, latch tail 310, second shell or cover 400, opening 401, spring 500, first shell or cover 600.

DETAILED DESCRIPTION

FIGS. 1a-13b show the structure of an optical module 10, comprising a first shell or cover 600, a second shell or cover 400, a pedestal 100 and a de-latching mechanism.

The top of the first shell or cover 600 has a lock hole (not shown).

The pedestal 100 includes a first cavity 103 and one or more sliding grooves 101. The first cavity 103 has a shape that accommodates the latch fitting 300 and/or allows the latch fitting 300 to fit therein. In the first cavity 103, the space is sufficient to accommodate at least a tapered end 302 and a latch tail 310, and to enable the latch fitting 300 to rotate around a spindle 305 in order to perform a latching and/or de-latching operation. The sliding grooves 101 are configured to cooperate with a pull rod that can rotate around its axial line as well as slide in a horizontal direction within or along the sliding grooves 101. That is to say, the length of the sliding groove 101 is greater than the diameter of the pull rod.

Figure 2:
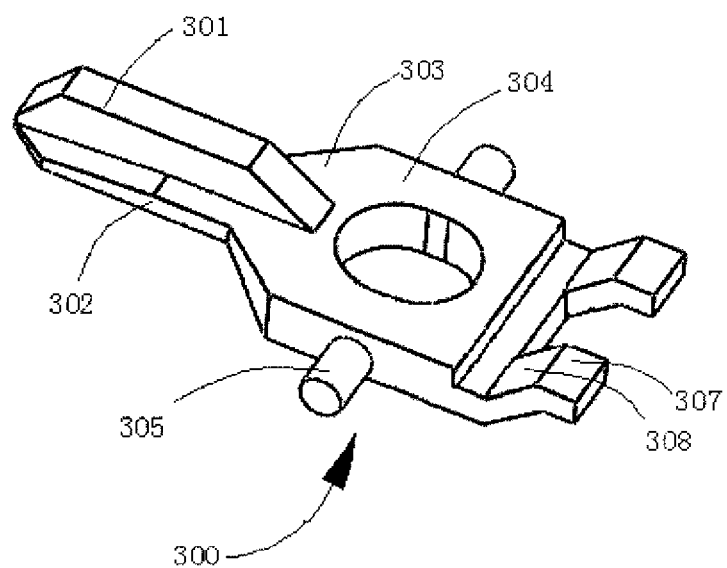
FIG. 2 shows an exemplary latch fitting in accordance with a first embodiment of the present invention.
Figure 3A:
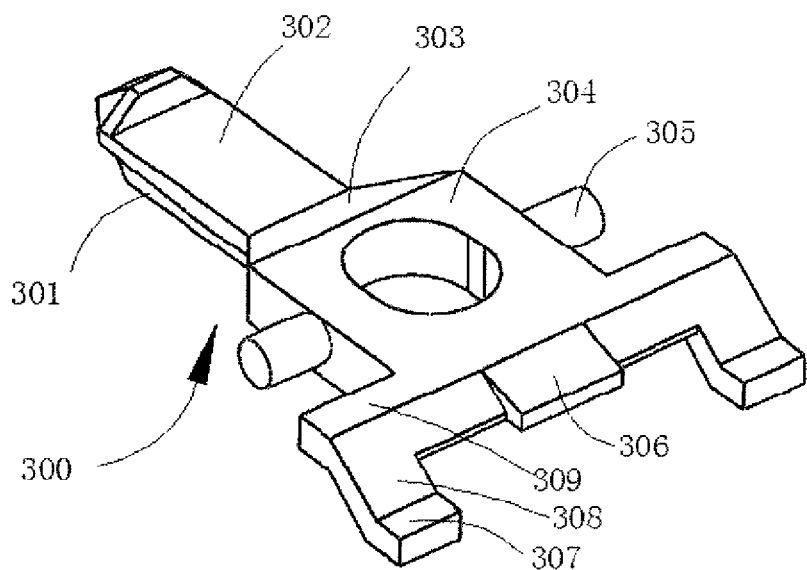
FIGS. 3a-3b show an exemplary latch fitting in accordance with a second embodiment of the present invention.

The de-latching mechanism may include the latch fitting 300, an elastic piece and a pull tab 200. As shown in FIGS. 2-3a, the latch fitting 300 includes the tapered end 302, a latch body 304 and the latch tail 310 in serial connection.

In one embodiment, as shown in FIG. 3a, the tapered end 302 has a hook-like structure and a tilted or angled end, and can protrude from the top of the first shell or cover 600 through the lock hole on the top of the first shell or cover 600. As the end of the tapered end 302 that has a tilted or angled end face, the tapered end 302 can be pressed downwards when the tilted or angled end face squeezes or is pushed against the frame of the cage or socket as the optical module 10 is inserted into the cage or socket. Further, the tapered end 302 automatically resets to latch the optical module 10 in the cage or socket when the optical module 10 is completely inserted into the cage or socket.

In another embodiment, the bottom of the tapered end 302 has a strengthening plate 301 that can strengthen the tapered end 302 and prolong its usage life.

The latch body 304 has the spindle 305 through which the latch fitting 300 can be connected to the pedestal 100. The latch fitting 300 can rotate around the spindle 305. In order to increase the contact area between the spindle 305 and the pedestal 100 and increase the stability of the connection between the latch fitting 300 and the pedestal 100, the width of the latch body 304 is greater than that of the tapered end 302 (e.g., the projective plane of the latch body 304 is greater than that of the tapered end 302). Thus, a transition portion 303 with a trapezoid structure connects the tapered end 302 to the latch body 304. Referring to FIG. 1a, the pedestal 100 has a cylinder with screw hole (the threads of which are not shown), and the latch body 304 has a hole to sheathe or surround the cylinder. The latch body 304 can therefore be secured to the pedestal 100 with a screw. Cooperative usage of the cylinder and the spindle 305 can further improve the stability of the connection between the latch fitting 300 and the pedestal 100 so that the latch fitting 300 only rotates around the spindle 305 without sliding forth and back.

In the first embodiment of the present invention, the latch tail 310 includes a first de-latching portion configured to perform a de-latching operation by sliding movement.

Referring to FIG. 2, in this embodiment, the first de-latching portion may include one or more tilted or angled stand bars 308. The embodiment has two de-latching portions. That is to say, the latch tail 310 as shown includes two tilted or angled stand bars 308 that can be connected to the latch body 304 directly or through a connecting rod or a plate such as the extended face plate 309. As an option, the first de-latching portion may be or comprise a cant plate.

Furthermore, the tilted or angled stand bar(s) 308 may have an extended end 307, in parallel with the pedestal 100 and/or the latch body 304 when latched. In one aspect, the extended end 307 can increase the origins of force for the tapered end 302 relative to the pedestal 100 and the stability of the connection between the latch fitting 300 and the optical module 10. In another aspect, an upward force can be applied to the bottom of the extended end 307 to implement one or more de-latching operations in an emergency circumstance.

Figure 4:
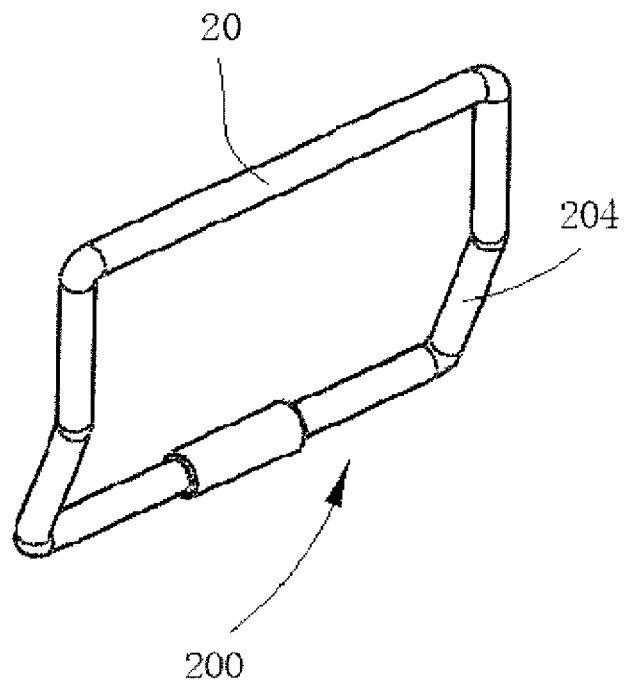
FIG. 4 shows an exemplary pull-tab in accordance with the first embodiment of the present invention.

Referring to FIG. 4, in one embodiment, a pull-tab 200 includes a pull rod comprising an arm portion 20 configured to cause the first de-latching portion (tilted or angled stand bar 308) to move upward or away from the pedestal 100 when the pull rod slides within or along the sliding groove 101.

Figure 13A:
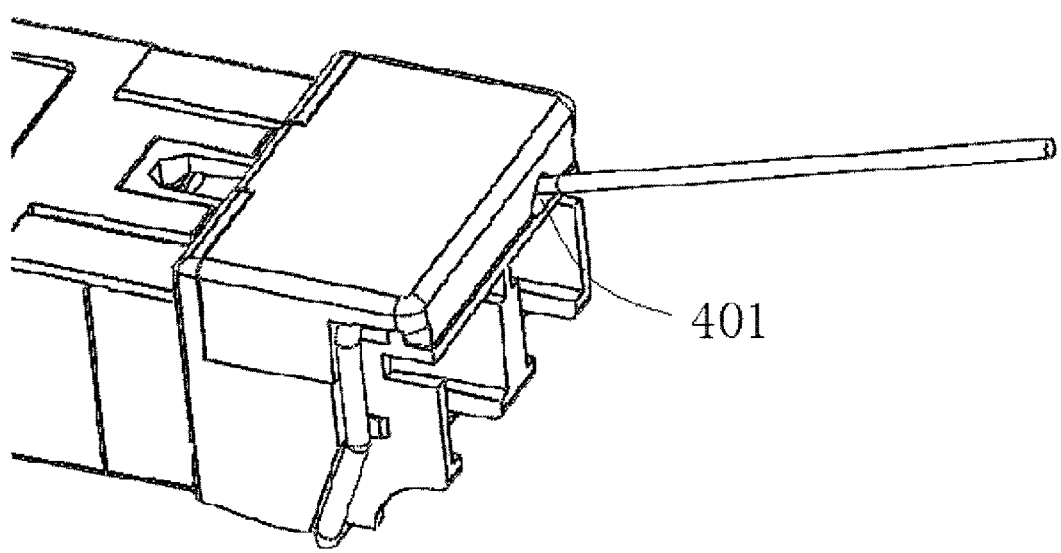
FIGS. 13a-13b are diagrams showing an optical module with an exemplary opening for urgently de-latching the optical module.
Figure 13B:
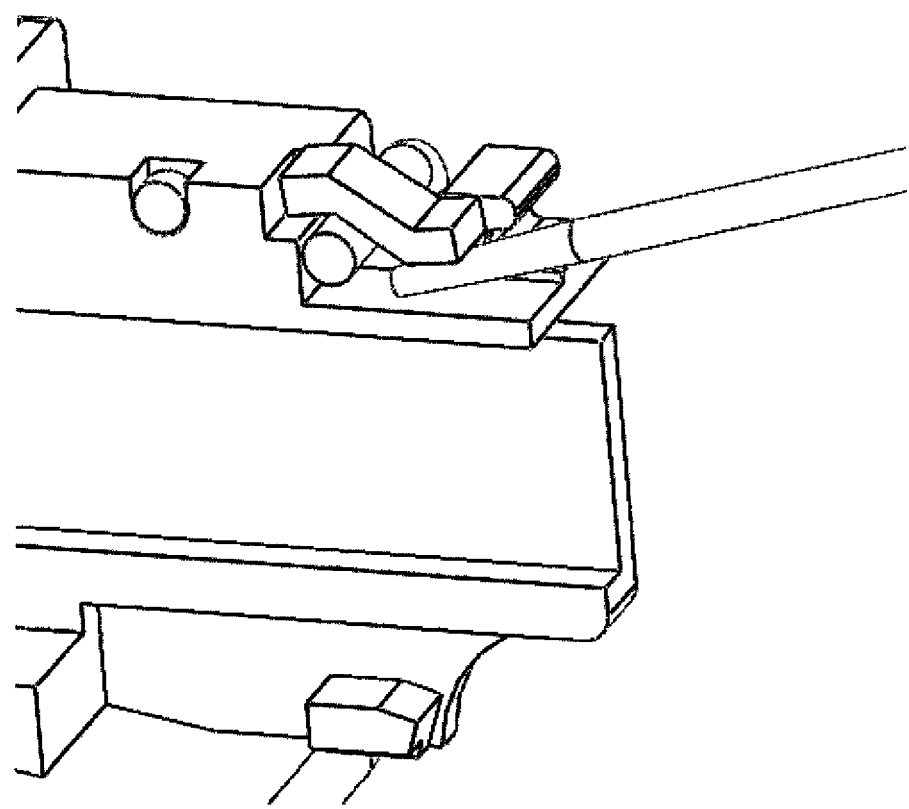

Referring to FIGS. 1a, 13a and 13b, the optical module 10 may further comprise a second shell or cover 400 having an opening 401. There is a gap between one extended end 307 of the latch body 300 and the pedestal 100, communicating or aligned with the opening 401.

The optical module according to one embodiment is provided with two de-latching methods.

Figure 7A:
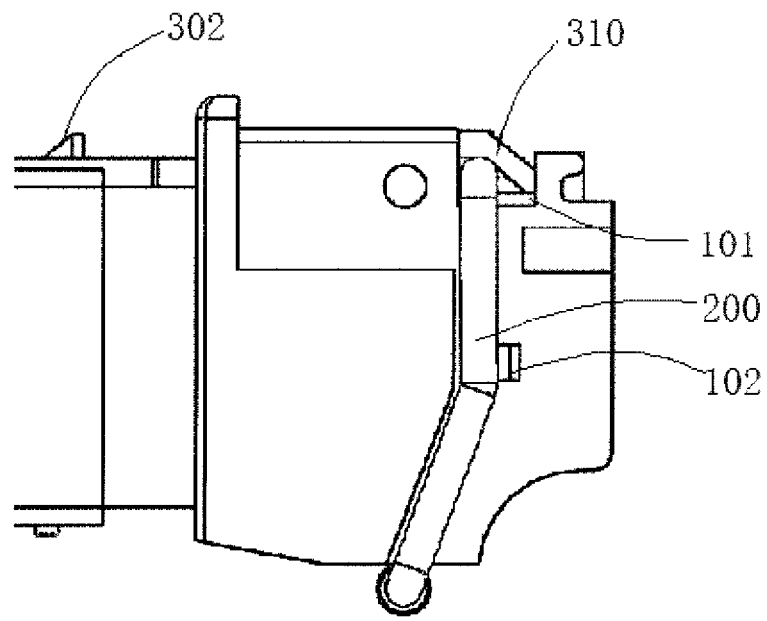
FIGS. 7a-7b are diagrams showing an optical module before and after de-latching by sliding movement in accordance with the first embodiment of the present invention.
Figure 7B:
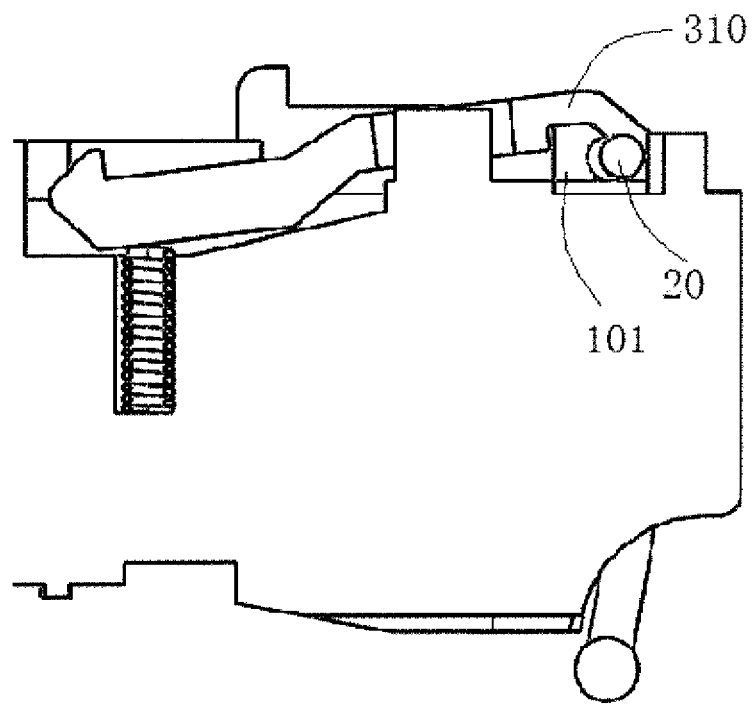

Method one: referring to FIGS. 7a-7b, an external force is applied to the pull-tab 200 to make the arm portion 20 of the pull rod slide within or along the sliding groove 101. During the sliding movement, the arm portion 20 of the pull rod contacts and pushes the tilted or angled stand bar 308, causing the tilted or angled stand bar 308 to move upward (as the latch fitting 300 cannot move back and forth, neither can the tilted or angled stand bar 308). As a result, the latch tail 310 moves up vertically. Accordingly, the tapered end 302 moves down vertically. When the latch tail 310 rises to a predetermined position, it separates the tab or protrusion on the tapered end 302 from the lock hole to achieve de-latching.

Method two: referring to FIGS. 13a-13b, a tool (such as a stick as shown) is inserted into the opening and enters the gap between the extended end 307 and the pedestal 100. The end of the tool is utilized to pry up the bottom of the extended end 307. As a result, the latch tail 310 moves up vertically and the tapered end 302 moves down vertically, thereby de-latching the optical module 10. This method can be employed in urgent circumstances (for example, the pull-tab 200 does not work).

In another embodiment of the present invention, the latch tail 310 further comprises a second de-latching portion configured to perform a de-latching operation by rotation.

Figure 3B:
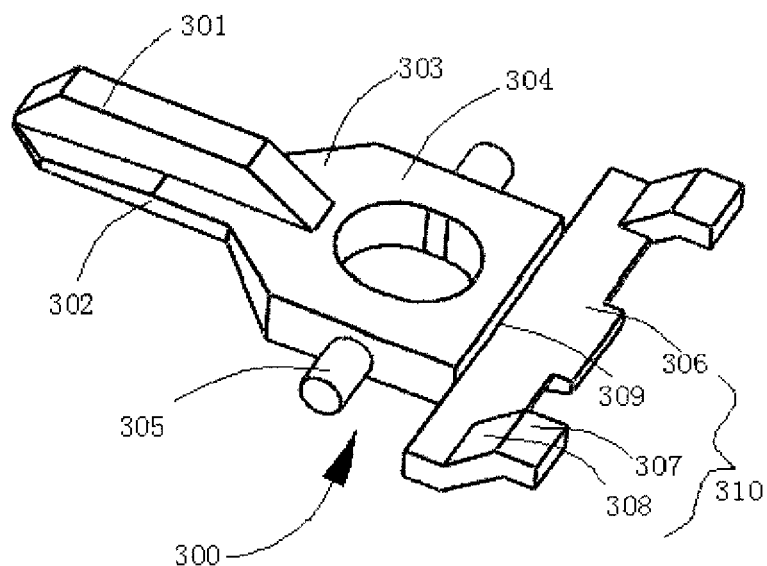

Referring to FIGS. 3a-3b, in an alternative embodiment, the second de-latching portion may include a surface plate 306.

In one embodiment, the tilted or angled stand bar 308 is deployed on the end or side(s) of the surface plate 306. When de-latching by rotating the pull rod, the pull rod (not shown) may cause the surface plate 306 to move upward during the rotation. As a result, the latch tail 310 moves up vertically. Consequently, the tapered end 302 moves down vertically to release the latch fitting 300 from the lock hole. For space saving, as shown in FIG. 3b, the surface plate 306 may have a convex structure in one embodiment.

In another alternative embodiment, the surface plate 306 has an extended faceplate 309 connected to the latch body 304. The extended faceplate 309 and the tilted or angled stand bar 308 form a bent structure that can strengthen the latch tail 310 and prolong its usage life. The latch fitting 300 can be manufactured by integral forming (e.g., injection molding, stamping, casting, etc.) for better strength.

Figure 11:
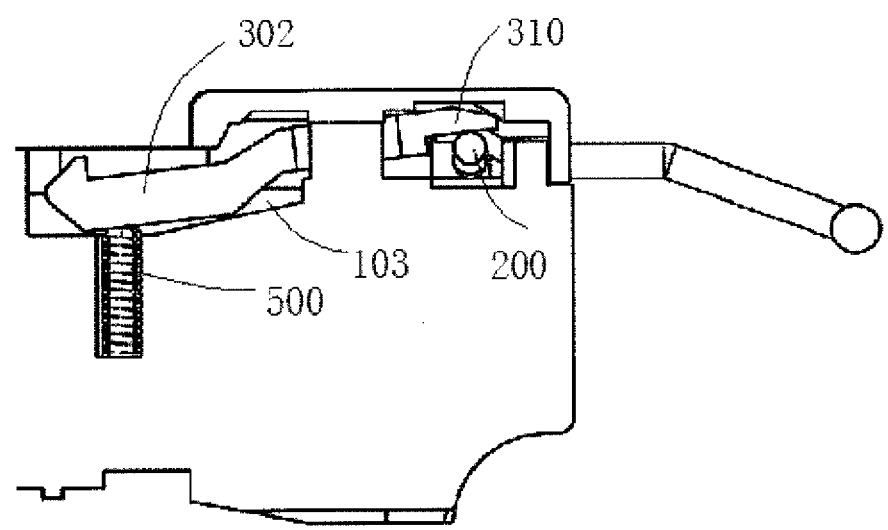
FIG. 11 is a cross-sectional view of the optical module of FIG. 10.
Figure 12:
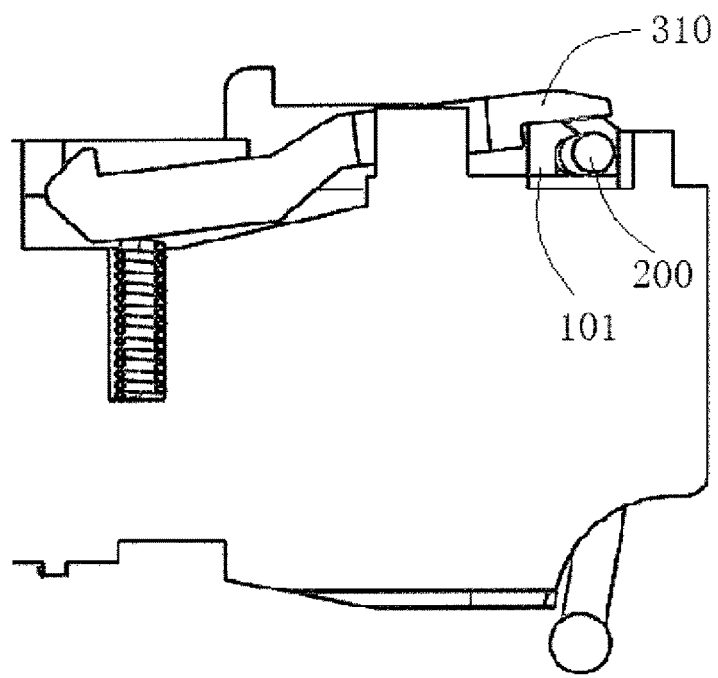
FIG. 12 is a cross-sectional view showing an optical module de-latched by sliding movement in accordance with the second embodiment of the present invention.

As shown in FIGS. 11-12, a spring 500 may be or function as an elastic piece. The pedestal 100 has a cavity (not shown) to accommodate the spring 500. The cavity accommodating the spring 500 communicates with a first cavity 103. The spring 500 is located under the strengthening plate 301 to maintain the latched status or state of the latch fitting 300.

Figure 5:
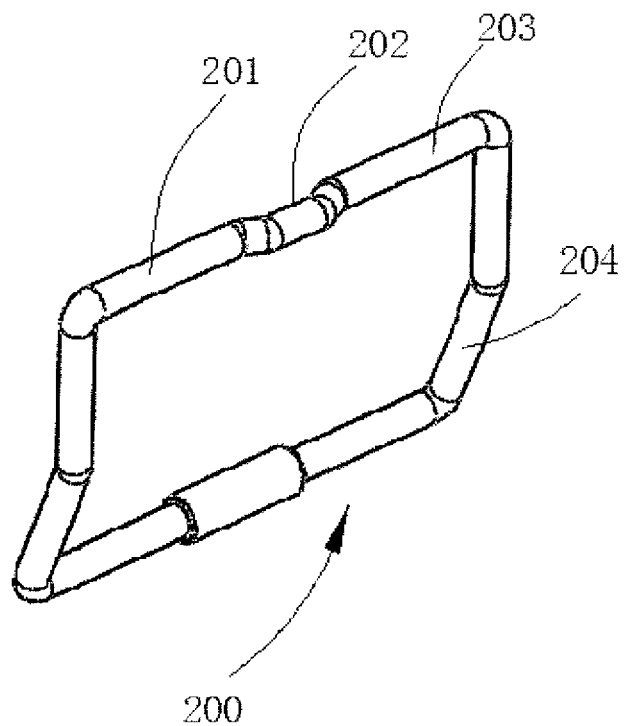
FIG. 5 shows another exemplary pull-tab in accordance with the second embodiment of the present invention.
Figure 6:
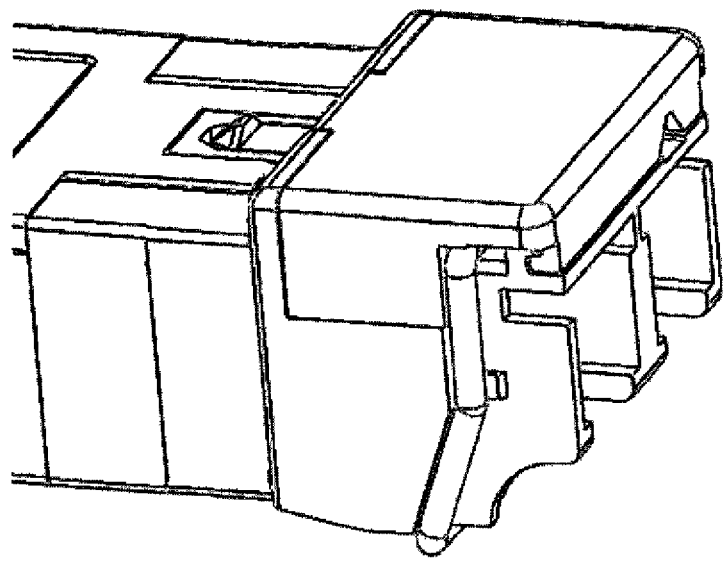
FIG. 6 shows a latched optical module in accordance with one or more embodiments of the present invention.

Referring to FIG. 5, the pull rod may comprise arm portions 201, 203 and a protrusion portion 202. The protrusion 202 is configured to force the second de-latching portion (e.g., surface plate 306) upward or away from the pedestal 100 to de-latch the optical module when the pull rod rotates within the sliding groove 101. The arm portion is configured to move the first de-latching portion upward to de-latch the optical module when the pull rod slides within or along the sliding groove 101. In this embodiment, the arm portion includes a first arm portion 201 and a second arm portion 203. The first arm portion 201, the protrusion portion 202 and the second arm portion 203 are connected serially. The first and second arm portions are also configured to lift the tilted or angled stand bars 308 to de-latch the optical module when the pull rod slides within or along the sliding groove 101.

In a further alternative embodiment, the pull-tab 200 may further include an angled or [-shaped rod 204, one end of which is connected to the first arm portion 201 and another end of which is connected to the second arm portion 203. The first arm portion 201, the protrusion portion 202, the second portion 203 and the angled or [-shaped rod 204 form a closed structure such as a circular structure or loop. Thus, one can handle the pull rod and/or the angled or [-shaped rod 204 to drive the pull rod to rotate or slide easily.

Figure 8:
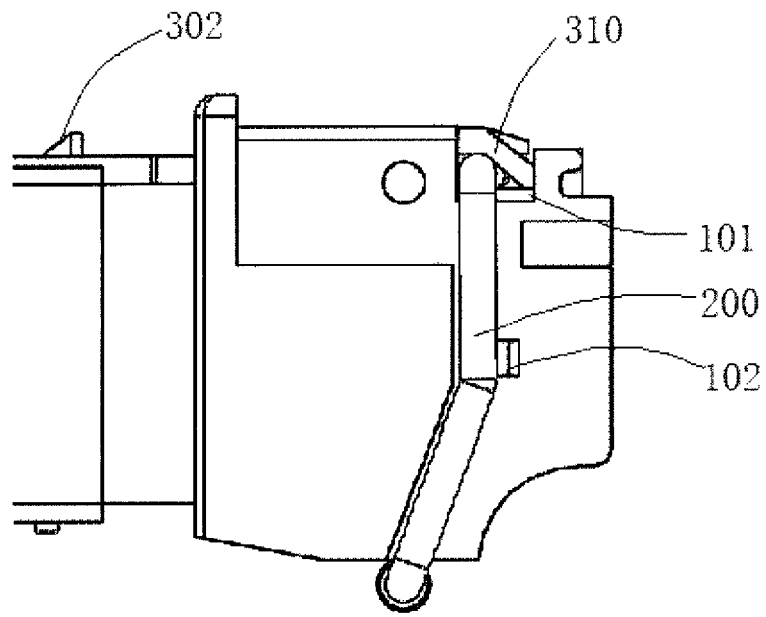
FIG. 8 is a side view of the optical module of FIG. 6.
Figure 9:
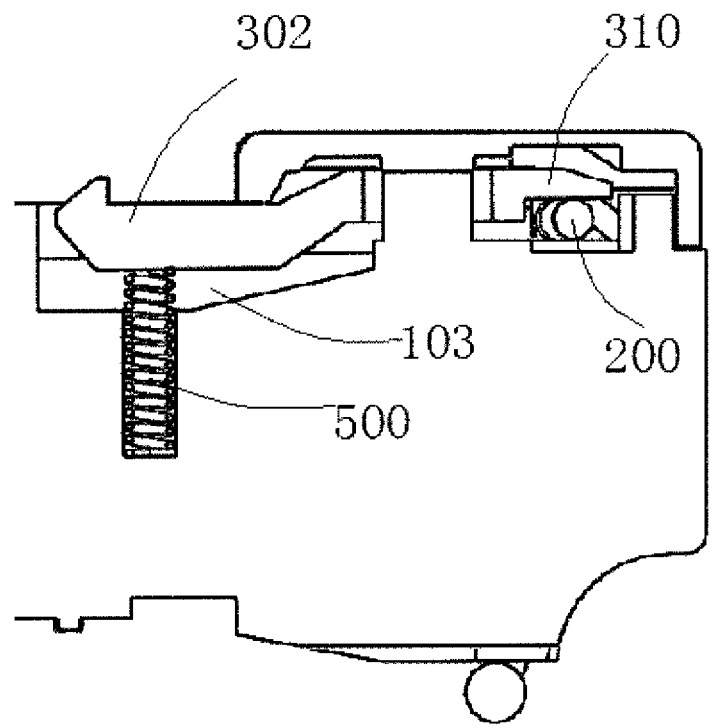
FIG. 9 is a cross-sectional view of the optical module of FIG. 6.
Figure 10:
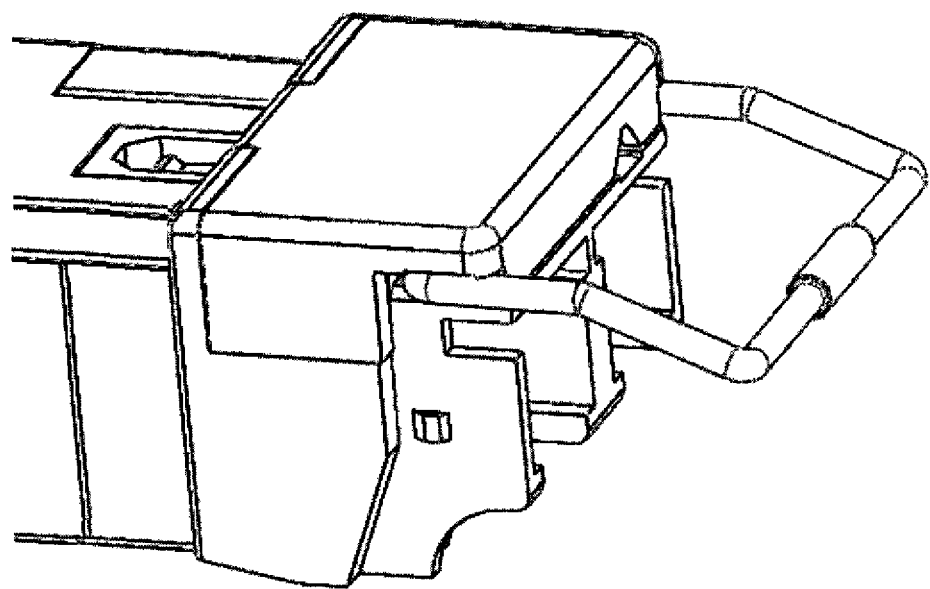
FIG. 10 is a diagram showing an optical module de-latched by rotation in accordance with the second embodiment of the present invention.

Referring to FIG. 8, either side of the pedestal 100 has a boss 102 configured to fasten or mate with the angled or [-shaped rod 204 and prevent interference to the operation of the optical module 10 due to the angled or [-shaped rod 204 swinging back and forth when the optical module 10 is latched. In this embodiment, both sides of the pedestal 100 have a boss 102. In other embodiments, only one side of the pedestal may have a boss.

Referring to FIGS. 10-13b, an optical module 10 in accordance with embodiments of the present invention is provided with four de-latching methods:

Method one: referring to FIGS. 8-11, an external force is applied to the pull-tab 200 to rotate the pull rod within the sliding groove 101. The surface plate 306 is forced upward by protrusion 202 when the pull rod slides rotate within the sliding groove 101. As a result, the latch tail 310 moves up vertically, and the tapered end 302 moves down vertically accordingly. When the pull-tab 200 rotates to a roughly horizontal position, the upward-facing tab on the tapered end releases from the lock hole.

Method two: referring to FIGS. 7a, 7b and 12, an external force is applied onto the pull-tab 200 to slide the pull rod within or along the sliding groove 101. During the sliding movement, the first and second arm portions 201 and 203 of the pull rod respectively contact and push the tilted or angled stand bar 308, forcing the tilted or angled stand bar 308 upward (as the latch fitting 300 cannot move horizontally along the pedestal, neither can the tilted or angled stand bar 308). As a result, the latch tail 310 moves up vertically. Accordingly, the tapered end 302 moves down vertically. When the latch tail 310 rises to a predetermined position, the tapered end is separated from the lock hole to achieve de-latching.

Method three: rotate the pull-tab 200 in the sliding groove 101, and the protrusion on the pull-tab forces the surface plate 306 upward; pull the pull-tab 200 to slide it within or along the sliding groove 101, and the pull rod forces the tilted or angled stand bar 308 upward; with the combined action of the protrusion portion 202 and the pull rod, the latch tail 310 is driven upward vertically while the tapered end 302 moves down vertically, thereby performing a de-latching operation. In this way, the de-latching operation goes with ease and prevents the tapered end of the latch fitting and the cage, socket and de-latching mechanism from being damaged due to complex operations. Especially, there is no sequence or order for rotating and sliding the pull rod.

Method four: referring to FIGS. 13a-13b, a tool (a stick or rod as shown) enters the gap 401 between the extended end 307 and the pedestal 100. The end of the tool pries up the bottom of the extended end 307. As a result, the latch tail 310 moves up vertically and the tapered end 302 moves down vertically, thereby achieving de-latching. This method can be employed in urgent circumstances (for example, the pull-tab 200 does not work).

In some embodiments of the present invention, the pedestal 100 further comprises a second cavity 104 configured to accommodate the optical transmitter-receiver subassemblies. The first and second cavities 103, 104 are separated from each other. As shown, the pull-tab 200 is external to the shell or cover of the optical module 10. If the first cavity 103 communicates with the second cavity 104, electromagnetic waves in the second cavity 104 may be emitted from the first cavity 103, causing undesired environmental radiation. When the first and second cavities 103, 104 are separated from each other, the present invention provides good EMI protection.

What is claimed is:
1. An optical module, comprising:
   a pedestal,
   a first cavity,
   one or more sliding grooves on the pedestal, and
   a de-latching mechanism comprising a latch fitting including:
      a tapered end,
      a latch fitting body connected to the tapered end,
      a latch fitting tail connected to the latch fitting body, the latch fitting tail comprising a first de-latching portion configured to perform a first de-latching operation by sliding movement and a second de-latching portion configured to perform a second de-latching operation by rotation,
      a spindle around which the latch fitting rotates, wherein the latch fitting is configured to fit inside the first cavity at the pedestal of the optical module and to rotate around the spindle to perform latching and de-latching operations, and a pull-tab including:
a pull rod configured to rotate within or along the one or more sliding grooves and to slide within the one or more sliding grooves,
an arm portion configured to force the second de-latching portion upward when the pull rod rotates within or along the one or more sliding grooves, and
a protrusion portion configured to force the first de-latching portion upward when the pull rod slides outwards within the one or more sliding grooves.

2. The optical module of claim 1, wherein the first de-latching portion comprises one or more tilted or angled stand bars.

3. The optical module of claim 2, wherein each of the one or more tilted or angled stand bars has an extended end, the extended end being parallel with the latch fitting body.

4. The optical module of claim 1, wherein the second de-latching portion includes a surface plate.

5. The optical module of claim 4, wherein the surface plate has one or more ends, and the first de-latching portion comprises one or more tilted or angled stand bars deployed on the one or more ends of the surface plate.

6. The optical module of claim 5, wherein the surface plate further comprises an extended plate connected with the latch fitting body, and the extended plate and the one or more tilted or angled stand bars form a bent structure.

7. The optical module of claim 1, wherein the tapered end includes a strengthening plate.

8. The optical module of claim 1, further comprising an elastic piece located under the tapered end, the elastic piece being configured to maintain the latch fitting in a latched state.

9. The optical module of claim 8, wherein the elastic piece includes a spring.

10. The optical module of claim 1, wherein:
the first de-latching portion comprises one or more tilted or angled stand bars, each having an extended end, and
the optical module further comprises a shell with an opening on an end face thereof, the opening being in communication with a gap between one of the one or more extended ends and the pedestal.

11. The optical module of claim 1, wherein:
the pull-tab further includes an angled or bracket-shaped rod having first and second ends,
the arm portion includes a first and second arm portions,
the first arm portion, the protrusion portion and the second arm portion are in serial connection,
the first and second ends of the angled or bracket-shaped rod are respectively connected to the first arm and second arm, and
the pull rod and the angled or bracket-shaped rod form a closed structure.

12. The optical module of claim 11, further comprising a boss on one side or each of two sides of the pedestal, configured to fix or mate with the angled or bracket-shaped rod.

13. The optical module of claim 1, further comprising a second cavity adjacent or proximate to the pedestal, configured to accommodate one or more optical transmitter-receiver subassemblies, wherein the first and second cavities are separate from each other.

14. The optical module of claim 1, wherein the pull-tab includes an angled or bracket-shaped rod having first and second ends.

15. The optical module of claim 14, wherein the arm portion includes a first and second arm portions, and the first arm portion, the protrusion portion and the second arm portion are in serial connection.

16. The optical module of claim 15, wherein the first and second ends of the angled or bracket-shaped rod are respectively connected to the first arm and second arm.

17. The optical module of claim 14, wherein the pull rod and the angled or bracket-shaped rod form a closed structure.

18. The optical module of claim 1, wherein the arm portion includes a first and second arm portions, and the first arm portion, the protrusion portion and the second arm portion are in serial connection.

* * * * *